United States Patent
Brunk et al.

(10) Patent No.: US 7,267,902 B2
(45) Date of Patent: Sep. 11, 2007

(54) UNITIZED MEMBRANE ELECTRODE ASSEMBLY AND PROCESS FOR ITS PREPARATION

(75) Inventors: Donald H. Brunk, Boothwyn, PA (US); Deepak Perti, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 421 days.

(21) Appl. No.: 10/928,891

(22) Filed: Aug. 27, 2004

(65) Prior Publication Data

US 2005/0100776 A1    May 12, 2005

Related U.S. Application Data

(60) Provisional application No. 60/498,818, filed on Aug. 29, 2003.

(51) Int. Cl.
*H01M 2/08* (2006.01)
*H01M 4/00* (2006.01)

(52) U.S. Cl. .......................................... 429/35; 429/40
(58) Field of Classification Search ................. 429/40, 429/35; 29/623.2, 623.3; 156/245
See application file for complete search history.

(56) References Cited

U.S. PATENT DOCUMENTS

| 5,464,700 A | 11/1995 | Steck et al. |
| 6,423,439 B1 | 7/2002 | Barton et al. |
| 2004/0112532 A1 | 6/2004 | Yandrasits et al. |

FOREIGN PATENT DOCUMENTS

| WO | WO 02/25753 A1 | 3/2002 |
| WO | WO 02/093669 A1 | 11/2002 |
| WO | WO 03/058731 A1 | 7/2003 |
| WO | WO 2005/020356 A1 | 3/2005 |

*Primary Examiner*—Patrick Joseph Ryan
*Assistant Examiner*—Thomas H. Parsons

(57) ABSTRACT

The invention provides a unitized membrane electrode assembly having improved edge sealing by a one-step compression molding process.

40 Claims, 2 Drawing Sheets

UNITIZED MEMBRANE ELECTRODE ASSEMBLY AND PROCESS FOR ITS PREPARATION

FIELD OF THE INVENTION

This invention relates to a unitized membrane electrode assembly ("UMEA") for use in electrochemical cells and more particularly to a unitized membrane electrode assembly wherein the components are electrically isolated from one another using an insulation layer. Further, the invention relates to a one-step compression molding process for preparing unitized membrane electrode assemblies providing high productivity.

BACKGROUND OF THE INVENTION

A variety of electrochemical cells falls within a category of cells often referred to as solid polymer electrolyte ("SPE") cells. An SPE cell typically employs a membrane of a cation exchange polymer that serves as a physical separator between the anode and cathode while also serving as an electrolyte. SPE cells can be operated as electrolytic cells for the production of electrochemical products or they may be operated as fuel cells.

Fuel cells are electrochemical cells that convert reactants, namely fuel and oxidant fluid streams, to generate electric power and reaction products. A broad range of reactants can be used in fuel cells, delivered in gaseous or liquid streams. For example, the fuel stream may be substantially pure hydrogen gas, a gaseous hydrogen reformate stream, or an aqueous alcohol, for example methanol in a direct methanol fuel cell (DMFC). The oxidant may, for example, be substantially pure oxygen or a dilute oxygen stream such as air.

In SPE fuel cells, the solid polymer electrolyte membrane typically is a perfluorinated sulfonic acid polymer membrane in acid form. Such fuel cells are often referred to as proton exchange membrane ("PEM") fuel cells. The membrane is disposed between and in contact with the anode and the cathode. Electrocatalysts in the anode and the cathode induce the desired electrochemical reactions and may be, for example, a metal black, an alloy or a metal catalyst supported on a substrate, e.g., platinum on carbon. SPE fuel cells typically also have a porous, electrically conductive sheet material in electrical contact with each of the electrodes that permits diffusion of the reactants to the electrodes. In fuel cells that employ gaseous reactants, this porous, conductive sheet material is sometimes referred to as a gas diffusion backing ("GDB"), which typically is a carbon fiber paper or carbon cloth. An assembly including the membrane, anode and cathode, and gas diffusion backing layers for each electrode, commonly is referred to as a membrane electrode assembly ("MEA"). Flow field plates, made of a conductive material that provide flow fields for the reactants, are placed between adjacent MEAs. A number of MEAs and flow field plates are assembled in this manner to provide a fuel cell stack.

US 2004/0112532 A1 published Jun. 17, 2004 discloses methods for making edge-sealed MEAs. In one embodiment, two annular layers of a thermoplastic material, a catalyst-coated membrane (CCM), and two non-edge-sealed gas diffusion layers (GDLs), in which a peripheral portion of the that does not bear catalyst coatings extends beyond the edges of the GDLs, are bonded together in a one-step process. The published application also describes a two-step process using two annular layers of a thermoplastic, a CCM, one non-edge-sealed GDL, and a second edge-sealed GDL, in which a peripheral portion of the membrane (not bearing catalyst coatings) remains within the edges of the GDLs. In this two-step process the edge-coated GDL is fabricated in a separate prior step. Alternatively, the published application discloses a process wherein an annular scrim layer circles the perimeter of the CCM, the scrim remaining within the edges of GDLs.

Most of the single process step embodiments disclosed in US 2004/0112532 A1 describe the edge of the membrane as extending all the way to the outer edge of the MEA. In this design, the extended portion of the membrane prevents the GDLs from contacting each other, thereby avoiding unwanted electrical pathways. However, such extension of the membrane often is undesirable since fuel cell coolant may come into contact with its exposed edges and thus cause degradation of the MEA.

The published application further discloses use of an annular scrim encircling the perimeter of a membrane that does not extend to the edges of the GDL. Such a construction is difficult to manufacture, however, since care must be taken to avoid inaccuracies in alignment or sizing that could result in gaps between the edges of the annular scrim layer and the edges of the polymer membrane. Such gaps may cause the gas diffusion backing layers to touch one another, resulting in unwanted electrical pathways. Furthermore, molten thermoplastic tends to flow sideways during hot pressing, which may cause the membrane border to move away and separate from the scrim layer. Such separations increase the potential for unwanted electrical pathways.

The published application discloses use of a shim that is substantially the same shape and size as the annular layers of thermoplastic and, therefore, the inner edges of the shim and the annular layers of the thermoplastic are coextensive. A disadvantage of having the inner edges coextensive is that lateral flow of the molten thermoplastic beyond the edges of the shim during the hot pressing step causes non-uniformity in the thickness of the seal area in the proximity of the electrochemically active area.

Accordingly, a need remains for a simple economical method for making UMEAs in small or large quantities, utilizing simple tooling. A need also remains for a fabrication method that is adaptable to a wide variety of different fuel cell designs.

SUMMARY OF THE INVENTION

In a first aspect, the invention provides a unitized membrane electrode assembly comprising:
  (a) a first porous gas diffusion backing layer having sealing edges substantially uniformly impregnated with a fluid-impermeable polymer;
  (b) a polymer electrolyte membrane having outer edges within the outer edges of the first and second gas diffusion backing layers;
  (c) a first electrocatalyst layer positioned between said first diffusion backing layer and said polymer electrolyte membrane, said electrocatalyst layer being essentially coextensive with said polymer electrolyte membrane surface;
  (d) a second porous gas diffusion-backing layer having sealing edges substantially uniformly impregnated with a fluid-impermeable polymer;
  (e) a second electrocatalyst layer positioned between said second diffusion backing layer and said polymer electrolyte membrane, said electrocatalyst layer being essentially coextensive with said polymer electrolyte membrane surface; present at the interface of the first gas diffusion backing and the polymer electrolyte membrane;

(f) at least one frame-shaped insulation layer positioned within the unitized membrane electrode assembly such that it prevents contact between the first and second gas diffusion backing layers, the outer edges of the polymer electrolyte membrane overlapping with the inner edges of said insulation layer; and (g) a fluid-impermeable polymeric seal that envelops the outer edges of the polymer electrolyte membrane.

The framed insulation layer is present between the sealing edges of the first and second gas diffusion backing layers, and the inner edges of the framed insulation layer overlap the outer edges of the polymer membrane. The first and second electrocatalyst coating compositions may be applied to the polymer membrane to form a catalyst-coated membrane prior to the assembly of the lay-up sandwich, which will be compression molded. This embodiment is employed when the unitized membrane electrode assembly is fabricated employing a catalyst coated membrane (CCM) sub-assembly. Applicants have found that the edge-sealed MEA structure, in which the catalyst coating extends to the edges of the membrane, typically does not exhibit delamination between the seal material and the CCM to the extent experienced when the membrane itself contacts the seal material. Alternately, the first and second electrocatalyst coating compositions may be applied to the first and second gas diffusion backing layers on the sides facing the polymer membrane to form gas diffusion electrodes prior to the assembly of the sandwich that will be compression molded. The framed insulation layer will then be present between the first and second electrocatalyst coating compositions.

Thermoplastic polymers are "materials that soften and flow upon application of pressure and heat."

"Sealing edge" is defined as the zone of a gas diffusion-backing layer that will be impregnated with the sealing polymer during fabrication of the UMEA. The sealing edge is physically defined by the outer perimeter of the gas diffusion-backing layer, and the outer perimeter of the desired active area of the UMEA (i.e., that portion of the membrane/catalyst coating designed to convert reactants and transport protons in fuel cell operation).

"Fluid impermeable seal" is defined as a barrier that blocks the migration of gases or liquids.

By "prevents contact between the first and second gas diffusion backing layers" is meant that electrical continuity between the first and second coated or uncoated gas diffusion backing layers is effectively blocked.

By "the outer edges of the polymer membrane and the inner edges of the insulation layer overlap" it is meant that the outer edges of the polymer membrane extend past the inner edges of the insulation layer in the direction towards the outer edge of the unitized membrane electrode assembly.

By "substantially uniformly impregnated" it is meant that all sealing surface edges are impregnated to the extent necessary to achieve the advantages of the invention as described herein and that there are no differences in the level of impregnation over the area of the seal that would effect performance or durability of the UMEA.

In a second aspect, the invention provides a UMEA prepared using a gas diffusion electrode (GDE), a construct where the gas diffusion backing layers bear the electrocatalyst layers. The electrocatalyst layer covers at least the portion of the gas diffusion-backing layer that will become the active surface of the UMEA, and may be coextensive therewith. In this embodiment, the insulation layer is placed between at least one of the electrocatalyst layers and the polymer electrolyte membrane, the outer edge being coextensive with the outer edge of the gas diffusion-backing layer and the inner edge overlapping the outer edge of the polymer electrolyte membrane. The resulting UMEA otherwise is substantially the same as the UMEA first described above.

In a third aspect, the invention provides a process for preparing a unitized membrane electrode assembly using compression-molding comprising:

(a) forming a multilayer sandwich comprising, in order, a first gas diffusion backing layer having sealing edges and first and second surfaces; a first electrocatalyst layer; a polymer electrolyte membrane having outer edges; a second electrocatalyst layer; and a second gas diffusion backing layer having sealing edges and first and second surfaces; and further comprising first and second frame shaped sealing polymer layers having inner and outer edges, wherein the first frame shaped sealing polymer layer may be positioned on either side of the first gas diffusion backing layer, and the second frame shaped sealing polymer layer may be positioned on either side of the second gas diffusion backing layer, and wherein the frame shaped sealing polymer layers overlap the sealing edges of the first and second gas diffusion backing layers; and further comprising a frame shaped insulation layer having inner and outer layer edges, positioned between the first and second gas diffusion backing layers, and wherein the inner edges of the insulating layer and the outer edges of the polymer membrane overlap; and (b) compression molding the multilayer sandwich between plates, wherein the sealing polymer is impregnated into the sealing edges of the first and second gas diffusion backing layers, and the sealing polymer envelops a peripheral region of both the first and second gas diffusion backing layers and the polymer membrane to form a fluid impermeable seal, and the frame shaped insulation layer, having an inner edge and an outer edge, prevents contact between the first and second gas diffusion backing layers; and (c) trimming away excess material to form the final desired shape.

The sealing polymer may be a thermosetting or curable resin polymer or a thermoplastic polymer. The formation of the multi-layer sandwich may employ one or more shims and/or release layers. A typical approach is to extend the inner edges of the shim beyond the inner edges of the annular thermoplastic layer. The first and second electrocatalyst compositions may be applied to the polymer membrane to form a catalyst-coated membrane prior to the assembly of the sandwich that will be compression molded.

DETAILED DESCRIPTION OF THE INVENTION

Figure 1A:
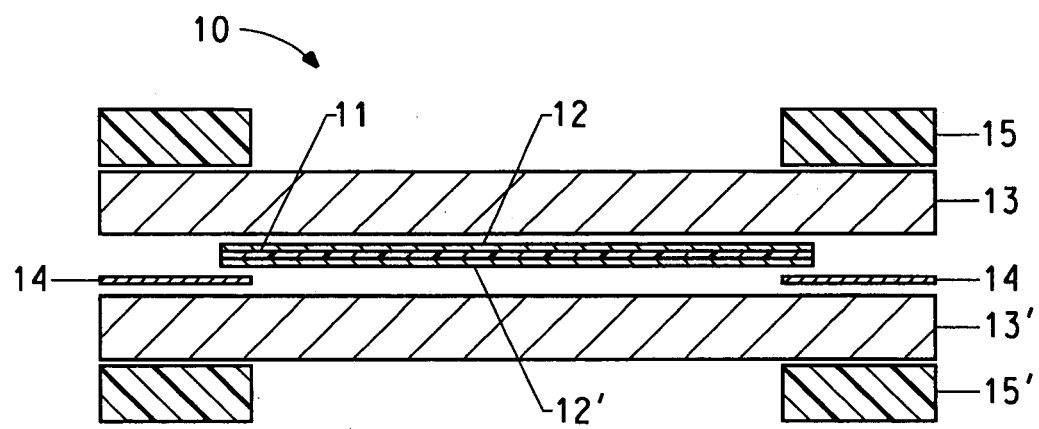
FIGS. 1A, 1B, and 1C are schematic illustrations of various configurations of a multilayer sandwich (10) used to form the unitized membrane electrode assembly (MEA).
Figure 1B:
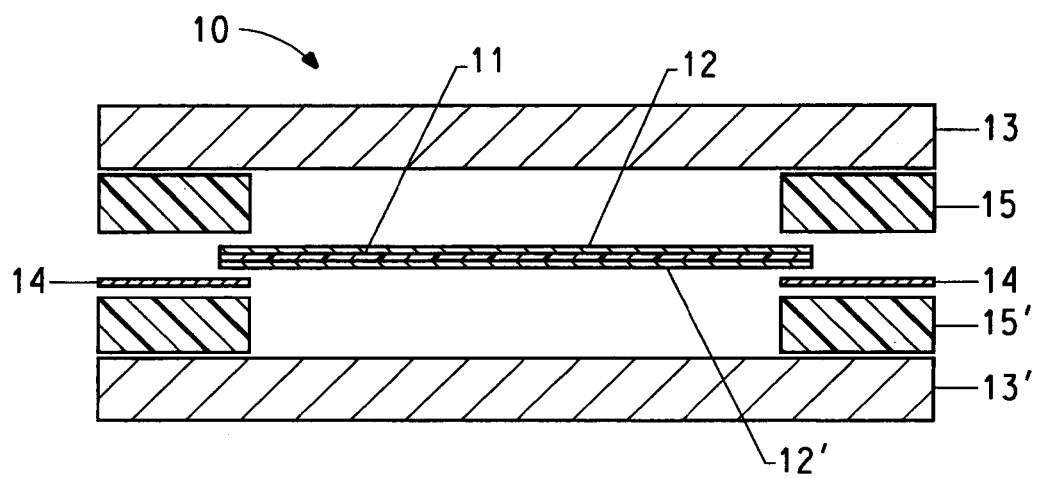
Figure 1C:
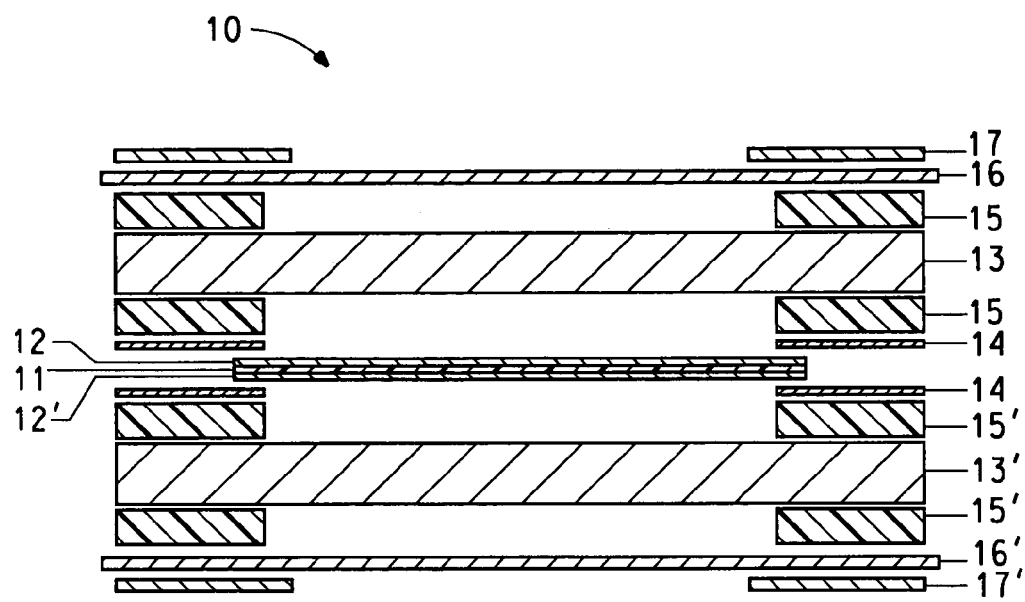

Unitized Membrane Electrode Assembly (UMEA):

The UMEA is prepared using a multilayer sandwich (10), shown in FIGS. 1A, 1B, and 1C, comprising a first gas diffusion backing layer having sealing edges (13); a first sealing polymer (15); a first electrocatalyst layer (12); a polymer electrolyte membrane (11); an insulation layer (14); a second sealing polymer (15'); a second electrocatalyst layer (12'); and a second gas diffusion backing layer having sealing edges (13'). In a preferred embodiment, the first and second electrocatalyst layers and the polymer electrolyte membrane are provided as a preassembled catalyst coated membrane. The UMEA has a polymer fluid impermeable seal (18), shown in FIG. 2 that prevents leak paths between the inner and exterior regions of the UMEA.

The sealing polymer is either a thermoplastic polymer or a thermosetting or curable resin. During molding, the sealing polymer is uniformly impregnated into the sealing edges of the first and second gas diffusion backing layers (13) and (13'). The resulting seal (18) envelops the polymer membrane (11). After molding, the UMEA may be trimmed to remove excess sealing polymer and excess portions of gas diffusion backing layers, provided that the trimming is not so severe that it exposes the polymer electrolyte membrane.

In another embodiment, the electrocatalyst layers are provided as coatings on the gas diffusion backing layers (known in the art as a GDE). In this embodiment, the insulation layer is provided adjacent to and substantially coextensive with at least one of the GDE's. The inner edge of the insulating layer overlaps the polymer electrolyte membrane as described above.

Gas Diffusion Backing:

The gas diffusion backing layers have sealing edges (13) and (13') constitute a porous electrically conductive material, typically having an interconnected pore or void structure. Typically, the gas diffusion-backing layer is cut from a roll or sheet of the material. The electrically conductive material typically is a corrosion-resistant material such as carbon, which may be formed into fibers. Such fibrous carbon structures may be in the form of a paper, woven fabric, or nonwoven web. Alternatively, the electrically conductive material may be in particle form. Mixtures of the fibrous carbon structures and the electrically conductive material in particulate form may be used. The electrically conductive material may be surface-treated to either increase or decrease its surface energy, allowing it to have either increased or decreased hydrophobicity, depending on the particular application.

A binder may be present to provide the structure with desired mechanical properties such as strength or stiffness. The binder itself may be chosen to serve the additional purpose of a surface treatment as mentioned above.

A microporous composition may also be present optionally on one or both of the gas diffusion backing layers. This composition may be located on one or both surfaces of the gas diffusion backing layer or impregnated into it or both, to afford electrical and/or fluid contact on a fine scale with the electrocatalyst coating. It may further enhance the ability of the gas diffusion backing to permit two-phase fluid flow during fuel cell operation, such as shedding liquid water in the cathode oxidant stream or shedding carbon dioxide bubbles in the anode stream of a direct-methanol fuel cell. It typically comprises electrically conductive particles and a binder. The particles may be, for example, high-structure carbon black such as Vulcane® XC72 manufactured by Cabot Corporation, or acetylene carbon black. The binder may be, for example, a polymer such as Teflon® polytetrafluoroethylene manufactured by El DuPont de Nemours & Company, Inc., Wilmington, Del.

First and Second Electrocatalyst Coating Compositions:

Proton conducting membranes, such as those fabricated using Nafion® polymer, generally adhere poorly to thermoplastic polymers and are prone to membrane delamination from the seal material after prolonged use and repetitive thermal and humidity cycling in a fuel cell. Such delamination typically results in crossover or lateral edge leak pathways along the membrane borders. It is relatively easy, however, to achieve good bonding with electrocatalyst compositions. Accordingly, coating compositions (12) and (12') are substantially coextensive with the electrolyte membrane in the embodiment using catalyst coated membranes (CCMs).

The electrocatalyst coating compositions (12) and (12') contain an electrocatalyst and an ion exchange polymer; the two coating compositions may be the same or different. The ion exchange polymer may perform several functions in the resulting electrode, such as serving as a binder for the electrocatalyst and improving ionic conductivity to catalyst sites. Optionally, other components are included in the composition, e.g., PTFE in particle form, for reasons that will be familiar to those skilled in the art.

Electrocatalysts in the composition are selected based on the particular intended application for the catalyst layer. Electrocatalysts suitable for use in the present invention include one or more platinum group metal such as platinum, ruthenium, rhodium, and iridium and electroconductive oxides thereof, and electroconductive reduced oxides thereof. The catalyst may be supported or unsupported. For direct methanol fuel cells, a $(Pt-Ru)O_x$ electrocatalyst is commonly selected. One particularly preferred catalyst composition for hydrogen fuel cells is platinum on carbon, for example, 60-wt % carbon, 40-wt % platinum, obtainable from E-Tek Corporation of Natick, Mass.

Since the ion exchange polymer employed in the electrocatalyst coating composition serves not only as binder for the electrocatalyst particles, but also may assist in securing the electrode to the membrane, it is preferable for the ion exchange polymers in the composition to be compatible with the ion exchange polymer in the membrane. Most preferably, exchange polymers in the electrocatalyst coating composition are the same type as the ion exchange polymer selected for use in the membrane.

Ion exchange polymers for use in accordance with the present invention are preferably highly fluorinated ion-exchange polymers. "Highly fluorinated" means that at least 90% of the total number of univalent atoms in the polymer are fluorine atoms. Most preferably, the polymer is perfluorinated. It is also preferred for use in fuel cells for the polymers to have sulfonate ion exchange groups. The term "sulfonate ion exchange groups" is intended to refer to either sulfonic acid groups or salts of sulfonic acid groups, preferably alkali metal or ammonium salts. For applications where the polymer is to be used for proton exchange as in fuel cells, the sulfonic acid form of the polymer is preferred. If the polymer in the electrocatalyst coating composition is not in sulfonic acid form when used, a post treatment acid exchange step will be required to convert the polymer to acid form prior to use.

Preferably, the ion exchange polymer has a polymer backbone with recurring side chains attached to the backbone with the side chains carrying the ion exchange groups. Possible polymers include homopolymers or copolymers of two or more monomers. Copolymers are typically formed from one monomer which is a nonfunctional monomer and which provides carbon atoms for the polymer backbone. A second monomer provides both carbon atoms for the polymer backbone and also contributes the side chain carrying the cation exchange group or its precursor, e.g., a sulfonyl halide group such a sulfonyl fluoride (—SO$_2$F), which can be subsequently hydrolyzed to a sulfonate ion exchange group. For example, copolymers of a first fluorinated vinyl monomer together with a second fluorinated vinyl monomer having a sulfonyl fluoride group (—SO$_2$F) can be used. Possible first monomers include tetrafluoroethylene (TFE), hexafluoropropylene, vinyl fluoride, vinylidine fluoride, trifluoroethylene, chlorotrifluoroethylene, perfluoro (alkyl vinyl ether), and mixtures thereof. Possible second monomers include a variety of fluorinated vinyl ethers with sulfonate ion exchange groups or precursor groups that provide the desired side chain in the polymer. The first monomer may also have a side chain, provided that the side chain does not interfere with the ion exchange function of the sulfonate ion exchange group. Additional monomers can also be incorporated into these polymers if desired.

Especially preferred polymers for use in the present invention include a highly fluorinated, most preferably perfluorinated, carbon backbone with a side chain represented by the formula —(O—CF$_2$CFR$_f$)$_a$—O—CF$_2$CFR'$_f$SO$_3$H, wherein R$_f$ and R'$_f$ are independently selected from F, Cl or a perfluorinated alkyl group having 1 to 10 carbon atoms, a=0, 1 or 2. The preferred polymers include, for example, polymers disclosed in U.S. Pat. No. 3,282,875 and in U.S. Pat. Nos. 4,358,545 and 4,940,525.

The electrocatalyst coating or electrocatalyst layer may be formed from a slurry or ink. The liquid medium for the ink is selected to be compatible with the process of application. The inks may be applied to the membrane by any known technique to form a catalyst-coated membrane. Some known application techniques include screen, offset, gravure, flexographic or pad printing, or slot-die, doctor-blade, dip, or spray coating. It is advantageous for the medium to have a sufficiently low boiling point that rapid drying of electrode layers is possible under the process conditions employed. When using flexographic or pad printing techniques, it is important that the composition not dry so fast that it dries on the flexographic plate or the cliché plate or the pad before transfer to the membrane film.

A wide variety of polar organic liquids or mixtures thereof can serve as suitable liquid media for the ink. Water in minor quantity may be present in the medium if it does not interfere with the printing process. Some preferred polar organic liquids have the capability to swell the membrane in large quantity although the amount of liquids the electrocatalyst coating composition applied in accordance with the invention is sufficiently limited that the adverse effects from swelling during the process are minor or undetectable. It is believed that solvents with the capability to swell the polymer membrane can provide better contact and more secure application of the electrode to the membrane. A variety of alcohols are well suited for use as the liquid medium.

Preferred liquid media include suitable C4 to C8 alkyl alcohols including, n-, iso-, sec- and tert-butyl alcohols; the isomeric 5-carbon alcohols, 1, 2- and 3-pentanol, 2-methyl-1-butanol, 3-methyl, 1-butanol, etc., the isomeric 6-carbon alcohols, e.g. 1-, 2-, and 3-hexanol, 2-methyl-1-pentanol, 3-methyl-1-pentanol, 2-methyl-1-pentanol, 3-methyl, 1-pentanol, 4-methyl-1-pentanol, etc., the isomeric C7 alcohols and the isomeric C8 alcohols. Cyclic alcohols are also suitable. Preferred alcohols are n-butanol and n-hexanol. Most preferred is n-hexanol.

If the polymer in the electrocatalyst coating composition is not in sulfonic acid form when used, a different liquid medium may be preferred in the ink. For example, if the one of the preferred polymers described above has its sulfonated groups in the form of sulfonyl fluoride, a preferred liquid medium is a high-boiling fluorocarbon such as "Fluorinert" FC-40 manufactured by 3M.

Handling properties of the ink, e.g. drying performance, can be modified by the inclusion of compatible additives such as ethylene glycol or glycerin up to 25% by weight based on the total weight of liquid medium.

It has been found that the commercially available dispersion of the acid form of the perfluorinated sulfonic acid polymer, sold by E. I. du Pont de Nemours and Company under the trademark Nafion®, in a water/alcohol dispersion, can be used, as starting material, for the preparation of an electrocatalyst coating composition suitable for use in flexographic or pad printing. Other printing methods, e.g. screen-printing, may also be used.

In the electrocatalyst coating composition, it is preferable to adjust the amounts of electrocatalyst, ion exchange polymer and other components, if present, so that the electrocatalyst is the major component by weight of the resulting electrode. Most preferably, the weight ratio of electrocatalyst to ion exchange polymer in the electrode is about 2:1 to about 10:1.

Utilization of the electrocatalyst coating technique in accordance with the process of the present invention can produce a wide variety of printed layers which can be of essentially any thickness ranging from very thick, e.g., 20 μm or more very thin, e.g., 1 μm or less. This full range of thickness can be produced without evidence of cracking, loss of adhesion, or other inhomogenieties. Thick layers, or complicated multi-layer structures, can be easily achieved by utilizing the pattern registration available using flexographic or pad printing technology to provide multiple layers deposited onto the same area so that the desired ultimate thickness can be obtained. On the other hand, only a few layers or perhaps a single layer can be used to produce very thin electrodes. Typically, the electrocatalyst coating compositions may be applied to membrane all the way to its outer edges. Typically, a thin layer ranging from 1 to 2 μm may be produced with each printing with lower % solids formulations. Some typical electrocatalyst coating compositions or inks are disclosed in U.S. Pat. No. 5,330,860.

The multilayer structures mentioned above permit the electrocatalyst coating to vary in composition, for example the concentration of precious metal catalyst can vary with the distance from the substrate, e.g. membrane, surface. In addition, hydrophilicity can be made to change as a function of coating thickness, e.g., layers with varying ion exchange polymer EW can be employed. Also, protective or abrasion-resistant top layers may be applied in the final layer applications of the electrocatalyst coating.

Composition may also be varied over the length and width of the electrocatalyst coated area by controlling the amount applied as a function of the distance from the center of the application area as well as by changes in coating applied per pass. This control is useful for dealing with the discontinuities that occur at the edges and corners of the fuel cell, where activity goes abruptly to zero. By varying coating composition or plate image characteristics, the transition to zero activity can be made gradual. In addition, in liquid feed fuel cells, concentration variations from the inlet to the outlet ports can be compensated for by varying the electrocatalyst coating across the length and width of the membrane.

Alternatively, the electrocatalyst compositions may be applied as a coating on the gas diffusion backing layers (a gas diffusion electrode or GDE preassembly), or may be provided as a separate layer. For example, the electrocatalyst composition may be provided as a film. If the film does not have sufficient strength to be self-supporting, the electrocatalyst composition may be cast on a release layer, for example, that is removed after the electrocatalyst composition during assembly of the components shown in FIG. 1.

Polymer Electrolyte Membrane:

Polymer electrolyte membrane (11) can be made of the same ion exchange polymers discussed above for use in the electrocatalyst layers. The membranes can be made by known extrusion or casting techniques and have thickness which can vary depending upon the application and typically have a thickness of about 350 µm or less. The trend is to employ membranes that are quite thin, i.e., about 50 µm or less. The process in accordance with the present in invention is well-suited for use in forming electrodes on such thin membranes where the problem associated with large quantities of solvent during coating are especially pronounced. While the polymer may be in alkali metal or ammonium salt form during the flexographic or pad printing process, it is preferred for the polymer in the membrane to be in acid form to avoid post treatment acid exchange steps. Suitable perfluorinated sulfonic acid polymer membranes in acid form are available under the trademark Nafion® by E.I. du Pont de Nemours and Company. Alternatively, membranes made from a variety of other ion-conducting polymers could be used, for example sulfonated polyaromatics as described in World Patent WO 00/15691.

Reinforced perfluorinated ion exchange polymer membranes can also be utilized in catalyst coated membrane (CCM) manufacture by the inventive printing process. Reinforced membranes, also known as "composite membranes" in the art, may be made by impregnating porous, expanded PTFE (ePTFE) with an ion exchange polymer. Expanded PTFE is available under the trade name "Goretex" from W. L. Gore and Associates, Inc., Elkton Md., and under the tradename "Tetratex" from Tetratec, Feasterville Pa. Impregnation of ePTFE with perfluorinated sulfonic acid polymer is disclosed in U.S. Pat. Nos. 5,547,551 and 6,110, 333.

Catalyst coated membranes or gas diffusion backing layers coated with electrocatalyst coating compositions may be provided with post treatments such as calendaring, vapor treatment to affect water transport, or liquid extraction to remove trace residuals from any of the above earlier steps. If the membrane dispersion or solution used was the precursor of the highly fluorinated ionomer, after application of the solution or dispersion the sandwich formed may be subjected to a chemical treatment to convert the precursor to the ionomer.

Insulation Layer:

The insulation layer prevents undesired contact between the gas diffusion backing layers. It is positioned such that its inner edges substantially overlap the outer edges of an electrocatalyst layer, without extending into the functioning area of the MEA, when using a CCM subassembly. The outer edges of the insulation layer are substantially coextensive with the outer edges of the adjacent gas diffusion-backing layer. Only one insulation layer typically is required, but additional insulation layers may be present, such as adjacent to both surfaces of the CCM subassembly. Since the insulation layer overlaps the electrocatalyst layer problems resulting from inaccuracies in alignment or sizing are avoided. Such inaccuracies could result in gaps between the edges of the annular scrim layer and the edges of the polymer membrane. Such gaps may cause the gas diffusion backing layers to touch one another, resulting in unwanted electrical pathways. Furthermore, molten thermoplastic tends to flow sideways during hot pressing, which may cause the membrane border to move away and separate from the scrim layer. Such separations increase the potential for unwanted electrical pathways.

When using a gas diffusion electrode (GDE) subassembly, the insulation layer is positioned adjacent to the GDE electrocatalyst layer such that its outer edge coincides with the outer edge of the GDE. The inner edge of the insulation layer overlaps the outer edge of the polymer electrolyte membrane in the same manner as described above with respect to UMEAs fabricated using a CCM subassembly.

The materials present in the insulation layer (14) are non-conductive, non-contaminating to the fuel cell, and thermally and dimensionally stable at fuel cell operating temperatures. Generally materials with a resistivity of greater than about 10E4 ohm-cm, and more typically a resistivity of greater than about 10E6 ohm-cm, and most typically a resistivity of greater than about 10E9 ohm-cm are useful in practicing the invention. The material may be in the form of a film, woven or non-woven fabric or paper. The selected material is capable or adhering or bonding to the sealing polymer sufficiently well to prevent delamination of the assembly during subsequent handling and during use in a fuel cell. This result can be achieved either through mechanical bonding, wherein the sealing polymer penetrates and solidifies in pores in a fabric or paper insulation layer, or through chemical bonding.

The thickness of the Insulation Layer is not critical, providing the above criteria are met. The minimum thickness is limited only by practicalities of handling the material, and the amount needed to maintain mechanical integrity against processing forces that would penetrate it allowing contact between the gas diffusion backing layers. The maximum thickness is limited by the requirements of the design of the fuel cell, and the stresses imposed on the other components in the UMEA. If the thickness is large compared to the membrane, the gas diffusion backing layers may incur damage due to bending stresses. Insulation layers having a thickness approximately that of the polymer membrane have been found to be particularly useful in practicing the invention.

Some examples of useful insulation layer materials that may be selected include fiber glass cloth, para-aramid fiber based papers such as Kevlar® paper (DuPont), polyimide films such as Kapton® film(DuPont), polyamide films such as Dartek® film(DuPont), polyester films such as polyethylene terephthalate and polyethylene napthanate. Some examples of polyethylene terephthalate films include Melinex® and Mylar® (DuPont).

In one embodiment, the insulation layer is a modified linear low density polyolefin, such as Bynel® 4105 modified polyester resin (DuPont). The insulating material may also be in the form of particles or fibers in a resin matrix. The insulation layer may be provided as a separate layer, or be coextruded or laminated with other components such as the sealing polymer.

Sealing Polymer:

Applicants have found that the optimum number of annular layers of sealing polymer, and their thicknesses, is selected based on the characteristics of thickness, porosity, or presence of a microporous layer, and on the design specifications of the seal, such as, thickness, width, resistance and acceptable leak rate. Sometimes use of two annular layers of sealing polymer, as illustrated in FIGS. 1A and 1B, will achieve the purposes of the invention; i.e. achieving uniform distribution of the thermoplastic sealing material within the porous GDB layer, while limiting distribution to the seal area alone. Uncontrolled distribution of sealing polymer within the GDB layer can cause a number of undesirable effects such as: encroachment of the sealing polymer into the active area of the MEA; incomplete impregnation, resulting in insufficient sealing; overly thick or thin sealing areas; and poor surface finish. This is especially the case when the GDB layer is coated with a micro-porous layer on one or both sides adjacent to the electrode layers. The production process is more forgiving, however, and is easier to control in a preferred embodiment illustrated in FIG. 1C wherein 4 layers of sealing polymer (15 and 15') are provided to facilitate controlled uniform distribution of the sealing polymer.

The selected sealing polymer (15) and (15') used to seal and bond the UMEA has a melting point higher than the maximum temperature attainable in the fuel cells (currently ~95° C.), and lower than the temperature that polymer electrolyte membrane can withstand (150° C. for Nafion®). It should be non-contaminating to the fuel cell. The material should adhere to polymer electrolyte membranes and/or to the electrocatalyst layer in the preferred embodiment wherein the polymer electrolyte membrane and electrocatalyst layers are coextensive. The material should also have flow characteristics at processing conditions that allow it to fully impregnate the adjacent GDB when compression molded.

The sealing polymer may be a thermoplastic polymer or a thermosetting polymer, more typically, a thermoplastic polymer. Thermoplastic polymers are "materials that soften and flow upon application of pressure and heat." Chemically, thermoplastic processing is essentially inert, with very low emissions and little or no appreciable chemical reaction-taking place. Thus, problems such as environmental impact, worker exposure, and bubble formation in the parts are minimal. Thermoplastics as a class include some of the most chemically inert materials in common usage, such as fluoropolymers and aromatic poly(ether ketone)s. Such sealing polymers are available with extremely low levels of any potential fuel cell contaminants, such as metals, catalysts, and reactive functional groups.

Thermoplastic polymers offer a wide range of physical properties of interest to the fuel cell designer. Semicrystalline forms such as high-density polyethylene and polyvinylidene fluoride have particularly low permeability to gases and liquids, and high mechanical toughness. Many have high compressive moduli, either in the neat or reinforced forms, and so can be used to rigidly support fuel cell stack pressure without significantly changing the MEA thickness. Finally, thermoplastics such as melt-processible fluoropolymers offer very durable electrical properties, including dielectric strength and electrical resistance.

The wide variety of materials that may be selected in practicing the invention include: melt-processible fluoropolymers such as DuPont Teflon® FEP 100 and DuPont Teflon® PFA 340, as well as partially fluorinated polymers, an example being polyvinylidene fluoride such as Kynar® 710 and Kynar Flex® 2801 manufactured by Atofina Chemicals, King of Prussia, Pa. Thermoplastic fluoroelastomers such as Kalrez® and Viton®, manufactured by E.I. Du Pont de Nemours & Company, Inc., Wilmington, Del., also fall into this class. Aromatic condensation polymers such as polyaryl(ether ketone)'s, an example being polyaryl (ether ether ketone) manufactured by Victrex Manufacturing Limited, Lancashire, Great Britain; modified polyethylene such as Bynel® 4105, modified polypropylene such as Bynel® 50E561, both manufactured by DuPont; polyethylene such as Sclair® 2318 manufactured by NOVA Chemicals Corporation, Calgary, Alberta, Canada; thermoplastic elastomers such as Hytrel® (DuPont); liquid-crystal polymers such as Zenite® liquid-crystal polyester (DuPont), and aromatic polyamides such as Zytel® HTN (DuPont).

The sealing polymer may also be optionally reinforced with fibers, fabrics, or inorganic fillers, which may either be placed in the mold during the compression molding process or compounded into the sealing polymer beforehand.

Process for Making a Unitized MEA:

The process to make the UMEA, when the sealing polymer is thermoplastic, typically comprises assembling the layers together in a sandwich as illustrated in FIG. 1, and pressing them together while heating to melt the sealing polymer, and then cooling to freeze the sealing polymer while maintaining the pressure. The compression mold employed for this purpose typically has a shim that covers and extends inwardly beyond the inner edges of the sealing polymer. Typically, a final trimming operation removes excess material to achieve the final shape. Two or more of the layers of the sealing polymer may be used, and they typically exist in a sheet form (e.g. extruded film) in which the center has been removed to create a "picture frame." During lay-up, the layers are disposed such that the opening in the picture frame is aligned with the active area of the MEA. It is most often advantageous to use more than two layers of sealing polymer. By adjusting the number, thickness, and location of each layer, an optimal approximately uniform distribution of the sealing polymer can be achieved, throughout the structure, without causing encroachment of the sealing polymer onto the active area of the MEA. A poor distribution of sealing polymer can result in a number of undesirable effects, incomplete impregnation resulting in insufficient sealing, overly thick or thin sealing area, and poor surface finish.

The framed insulation layer is positioned between the sealing edges of the first and second gas diffusion backing layers, and the inner edges of the framed insulation layer overlap the outer edges of the polymer membrane by about 1 to about 10 mm, more typically about 2 to about 4 mm. The overlap is advantageous to the manufacturing of the UMEA, since it reduces the required accuracy of alignment of the insulation layer and the polymer membrane in registry, the accuracy of sizing the outer edges of the polymer membrane, and the accuracy of sizing the inner edges of the framed insulation layer. Without an overlap, inaccuracies in alignment or sizing can result in gaps between the edges of the insulation layer and the edges of the polymer membrane, providing opportunities for the gas diffusion backing layers to touch one another, resulting in unwanted electrical pathways. More than one insulation layer may be used, and may be disposed on either or both sides of the polymer membrane. Additional insulation layers increase protection against electrical pathways between the anode and cathode gas diffusion backing layers, which are more likely when using highly porous insulation layers.

Figure 2:
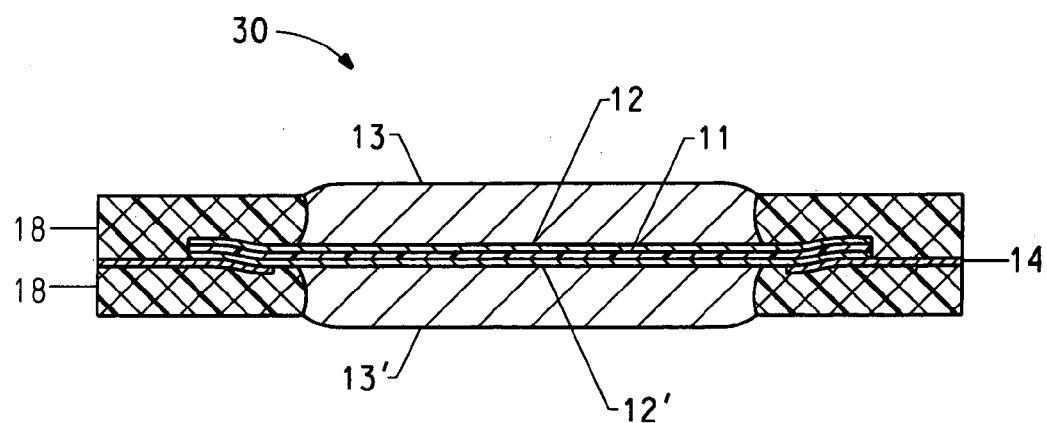
FIG. 2 is a schematic illustration of a unitized MEA (30) after its removal from the mold in the compression molding process.

The electrocatalyst layers and polymer electrolyte membrane are substantially coextensive. Although this results in the effective loss of electrocatalyst that becomes embedded in the seal, that loss is more than offset by the convenience of manufacture and the excellent bond achieved between the electrocatalyst layer and the sealing polymer. If so desired, the polymer electrolyte membrane layer and electrocatalyst layers are readily fabricated as a composite, which then is cut to desired size and placed in the multilayer sandwich. The desired size will vary with the MEA design, but is selected such that the polymer electrolyte membrane/electrocatalyst layer subassembly is completely embedded in the seal 18, as illustrated in FIG. 2, without unnecessary quantities of the electrocatalyst becoming embedded.

When the sealing polymer is a thermosetting polymer, the process conditions will have to be adjusted to accommodate the differences between thermosetting polymer's curing characteristics and the thermoplastic polymer's hardening (opposite of melting) characteristics.

Alternately the sealing polymer may be introduced in various forms, including powders, strips, fibers, fabric, liquid, or paste. It is preferable that it be introduced in a precisely metered manner, such as a die-cut film of controlled thickness or a metering pump with robotic control for a liquid. The sealing polymer is placed above and below the membrane electrode assembly components as shown in FIGS. 1A, 1B and 1C. As shown in FIG. 1A, the sealing polymer (15) and (15') may be present over the sealing edges of the gas diffusion backing layers (13) and (13') on the surface away from the electrocatalyst coating compositions (12) and (12'). Alternately, as shown in FIG. 1B, the sealing polymer may be present between the gas diffusion backing layers (13) and (13') and the polymer membrane (11) or the electrocatalyst coating compositions (12) and (12') if they extend to the sealing edges of the gas diffusion backing layers (13) and (13'). As shown in FIG. 1C, the sealing polymer may be positioned adjacent the both surfaces of the sealing edges of gas diffusion backing layers (13) and (13')

The insulation layer (14) is disposed between the GDBs (13) and (13'). As shown in FIG. 1C, more than one insulation layer (14) and (14') may be present.

We refer to this as a "one step process," as all of the assembly and sealing of the MEA takes place in a single operation. The pressure applied in the process must be sufficient to urge the melted polymer into the gas diffusion backing to fully impregnate and seal it. Typically, pressures used are in the range of 300 to 1000 kPa, more typically 500 to 600 kPa. In many fuel cell designs, it is desirable to have the thickness of the sealed border region equal to or less than the thickness of the MEA's active area when the MEA is assembled and compressed in the fuel cell. This requirement necessitates that the pressure applied in processing be sufficiently great to compress the GDB to achieve the desired thickness of the border region. Upon cooling, the solidified polymer maintains the desired thickness.

The multilayer MEA sandwich (10) is placed between two molding plates, typically graphite plates, and the sandwich/plate combination is moved to a hydraulic press heated to a temperature sufficient to melt the thermoplastic polymer. A pressure of about 100 to about 140 kPa is then applied to the molding plates for about 120 to about 240 seconds, followed by the application of pressure of 500 to about 600 kPa for about 10 to about 120 seconds. The assembly is cooled to room temperature while the applied force to the plates is maintained.

Any pressing apparatus suitable for heating and melting the thermoplastic seal material may be used in this invention. Some known presses include presses from Carver Inc., Wabash, Ind.; PHI, City Of Industry, Calif.; and Johnson Machinery Company, Bloomfield, N.J. A shim (not shown) may be placed on the frame between the top plunger and the frame to determine the extent to which the MEA components are compressed. The sealing polymer is preferably heated to just the point of complete melting throughout before cooling is initiated. After the sealing polymer is cooled sufficiently for it to have structural integrity, the unitized MEA, shown in FIG. 2 is removed from the between the mold plates. As can be clearly seen the unitized MEA (30) comprises the MEA sandwich components and an integral seal (18) formed from the compression molded sealing polymer. Alternately, the sandwich may be laminated between heated rolls.

Ridges, ribs and other features (not shown) may be provided on the seal by having recesses in the plates adjacent the seal.

An example of a well-known industrial process of compression molding was the production of phonograph records, which were typically made from compounded polyvinyl chloride. An example of such a process is described in *Principles of Polymer Systems, 2nd Ed.*, Ferdinand Rodriguez, McGraw-Hill, New York, 1982.

As shown in FIG. 1C, the process may include interposing one or more sheets of release material, (16) and (16'), between the pressing apparatus and the multilayer sandwich to prevent adhesion to the apparatus. Typically, this release material has low adhesion to the sealing polymer such that it may easily be removed from the unitized membrane electrode assembly before or after it has been trimmed to its final form.

It is sometimes necessary to apply greater pressure to the border region than to the rest of the assembly, such that in the final UMEA, the thickness of the sealing edges is less than the thickness of the active area of the UMEA, as required by the design of some fuel cell systems. This can be achieved by appropriate design of the molding plates or by interposing one or more appropriately shaped shims, (17) and (17') (as shown in FIG. 1C), between the pressing apparatus and the multilayer sandwich on one or both sides. The shim can be any shape as long as it provides additional compression to the sealing edges where reduced thickness is desired in the final UMEA. Consequently, the shim typically comprises a framed shaped sheet of material, with the inner edge of the shim extending beyond the inner edge of the sealing polymer towards the center of the frame opening. If the shim does not extend beyond the inner edge of the sealing polymer, then during the compression molding step, the sealing polymer will flow laterally beyond the inner edge of the shim, and impregnate a region of the gas diffusion backing, which has not been additionally compressed. After the compression molding process, this region may be thicker than the rest of the sealing edge. This locally thicker region may interfere with the function of UMEA when it is incorporated into a fuel cell.

If the shim is constructed of a release material, it may serve a dual function and eliminate the need for a separate release sheet on the side or sides where it is present.

Typically, the process steps described above are used to produce a semi-finished part from which the final UMEA is cut. This final trimming operation may be used to remove excess material, and can allow creation of features, such as openings in the seal area, which are advantageous for many fuel cell designs. It would be impractical to produce the finished UMEA without the final trimming operation as some sealing polymer flows laterally during the compression molding process.

Fuel Cell:

The unitized MEA (30) may be used to assemble a fuel cell. Flow field plates (not shown) are positioned on the outer surfaces of the first and second (cathode and anode) gas diffusion backing layers (13) and (13') having sealing edges. If the seal (18) is provided with ridges, domes, ribs, or other structural features (not shown), the flow field plates may be provided with recesses that mesh with these features on the seal (18).

The fuel cell further comprises a means for delivering a fuel to the anode, a means for delivering oxygen to the cathode, a means for connecting the anode and cathode to an external electrical load, hydrogen or methanol in the liquid or gaseous state in contact with the anode, and oxygen in contact with the cathode. The fuel is in the liquid or vapor phase. Some suitable fuels include hydrogen, alcohols such as methanol and ethanol; ethers such as diethyl ether, etc.

Several fuel cells may be connected together, typically in series, to increase the overall voltage of the assembly. This assembly is typically known as a fuel cell stack.

The invention will be further clarified with reference to the following examples. The examples are merely illustrative and are not intended to limit the scope of the invention.

EXAMPLES

Example 1

The following procedure was followed to prepare a unitized MEA:
1. Two 295 mm×189 mm pieces of gas diffusion backing (carbon fiber based paper, 190 microns thick, 85.5 gm/m$^2$ basis weight, sold as Toray TGP-H-060, available from Toray Composites (America) Inc., Tacoma, Wash.), were cut;
2. Two picture-framed sealing polymer films (130 micron thick, extruded from linear low density polyethylene resin sold as Bynel® 4105, available from E.I. DuPont de Nemours, Wilmington, Del.) having 295 mm×189 mm outside dimensions and 240 mm×138 mm inside dimensions were cut;
3. Two picture-framed sealing polymer films having 295 mm×189 mm outside dimensions and 240 mm×138 mm inside dimensions; and a thickness of 60 micron were cut;
4. One picture-framed insulation layer (para-aramid fiber based paper, 24 gm/m$^2$ basis weight) having 295 mm×189 mm outside dimensions and 240 mm×138 mm inside dimensions); and a thickness of 0.03 mm was cut;
5. The following layers were placed over each other to form a sandwich:
   1 release film (FEP fluoropolymer (Poly(tetrafluoro-ethylene-CO-hexafluoropropylene)) film, 250 microns thick, sold as Teflon® FEP 1000A film, available from E.I. DuPont de Nemours, Wilmington, Del.)
   1 Picture-framed 60 micron thick sealing polymer film
   1 gas diffusion backing
   1 Picture-framed 130 micron thick sealing polymer film
   1 Picture-framed insulation layer
   1 catalyst coated membrane (240 mm×134 mm active area with a 251 mm×145 mm membrane area) comprising two electrocatalyst layers on a polymer membrane
   1 Picture-framed 130 micron thick sealing polymer film
   1 gas diffusion backing
   1 Picture-framed 60 micron thick sealing polymer film
   1 release film as described above. The release layers are present to make separation of the unitized MEA from the plates after compression molding easier;
6. The sandwich was placed between a pair 303 mm×197 mm×12.7 mm thick graphite plates (available from SGL, St. Marys, Pa.) and combination of the sandwich/plates was placed in a hydraulic press preheated to 135° C. The press was a 100-ton hydraulic press (available from PHI, Pasadena, Calif.)
7. A force of 7100 N was applied on the plates for 3 min.;
8. A force of 28900 N was applied on the plates for 2 min.;
9. While maintaining the applied force, the plates were cooled to room temperature; and
10. The unitized MEA was trimmed to final size.

Example 2

The following procedure was followed to prepare a unitized MEA:
1. Two 420 mm×237 mm pieces of gas diffusion backing (carbon fiber based paper, 415 microns thick, 125 gm/m$^2$ basis weight, sold as Sigracet® GDL 10-BB, available from SGL Technologies, St. Marys, Pa., were cut;
2. Two picture-framed sealing polymer films (100 micron thick, extruded from linear low density polyethylene resin sold as Bynel® 4105, available from E.I. DuPont de Nemours, Wilmington, Del.) having 416 mm×233 mm outside dimensions and 307 mm×175 mm inside dimensions were cut;
3. Two picture-framed sealing polymer films having 416 mm×233 mm outside dimensions and 300 mm×175 mm inside dimensions; and a thickness of 75 micron were cut;
4. Two picture-framed insulation layers (para-aramid fiber based paper, 24 gm/m$^2$ basis weight) having 416 mm×233 mm outside dimensions and 300 mm×175 mm inside dimensions); and a thickness of 0.03 mm were cut;
5. Two picture-framed shims having outside dimensions of 416 mm×233 mm and inside dimensions of 294 mm×169 mm were cut from 0.1 mm thick Kapton® film (available from E.I. DuPont de Nemours, Wilmington, Del.);
6. The following layers were placed over each other to form a multilayer sandwich:
   1 picture-framed shim
   1 release film (FEP fluoropolymer (Poly(tetrafluoro-ethylene-CO-hexafluoropropylene)) film, 250 microns thick, sold as Teflon® FEP 1000A film, available from E.I. DuPont de Nemours, Wilmington, Del.)
   1 picture-framed 100 micron thick sealing polymer film
   1 gas diffusion backing
   1 picture-framed 75 micron thick sealing polymer film
   1 picture-framed insulation layer
   1 catalyst coated membrane, 306 mm×181 mm in size, comprising two electrocatalyst layers on a polymer membrane
   1 picture-framed insulation layer
   1 picture-framed 75 micron thick sealing polymer film
   1 gas diffusion backing
   1 picture-framed 100 micron thick sealing polymer film
   1 release film as described above. The release layers are present to make separation of the unitized MEA from the plates after compression molding easier
   1 picture-framed shim;
7. The multilayer sandwich was placed between a pair 424 mm×242 mm×12.7 mm thick graphite plates (available from SGL, St. Marys, Pa.) and combination of the multilayer sandwich/plates was placed in a hydraulic press preheated to 135° C. The press was a 100-ton hydraulic press (available from PHI, Pasadena, Calif.)

8. A force of 7.1 kN was applied on the plates for 3 min.;
9. A force of 222 kN was applied on the plates for 1 min.;
10. While maintaining the applied force, the plates were cooled to room temperature;
11. The plates were removed from the press, separated, and the unitized MEA was removed; and
12. The unitized MEA was trimmed to final size and shape, in the process adding features such as manifold holes in the sealed border region according to the design requirements of the fuel cell.

What is claimed is:

1. A unitized membrane electrode assembly comprising:
   (a) a first porous gas diffusion backing layer having sealing edges substantially uniformly impregnated with a fluid-impermeable polymer;
   (b) a polymer electrolyte membrane having outer edges within the outer edges of the first and second gas diffusion backing layers;
   (c) a first electrocatalyst layer positioned between said first diffusion backing layer and said polymer electrolyte membrane, said electrocatalyst layer being essentially coextensive with said polymer electrolyte membrane surface;
   (d) a second porous gas diffusion-backing layer having sealing edges substantially uniformly impregnated with a fluid-impermeable polymer;
   (e) a second electrocatalyst layer positioned between said second diffusion backing layer and said polymer electrolyte membrane, said electrocatalyst layer being essentially coextensive with said polymer electrolyte membrane surface;
   (f) at least one frame-shaped insulation layer positioned within the unitized membrane electrode assembly such that it prevents contact between the first and second gas diffusion backing layers, the outer edges of the polymer electrolyte membrane overlapping with the inner edges of said insulation layer; and
   (g) a fluid-impermeable polymeric seal that envelops the outer edges of the polymer electrolyte membrane.

2. The unitized membrane electrode assembly of claim 1 wherein the inner edges of the framed insulation layer overlap the outer edges of the polymer electrolyte membrane by 2 to 4 mm.

3. The unitized membrane electrode assembly of claim 1 or 2 wherein said first and second electrocatalyst layers are present on the polymer electrolyte membrane surfaces.

4. The unitized membrane electrode assembly of claim 3 wherein the framed insulation layer is present between both the first and second gas diffusion backing layers.

5. The unitized membrane electrode assembly of claim 1 wherein the sealing polymer is a thermoplastic polymer.

6. The unitized membrane electrode assembly of claim 5 wherein the sealing polymer is selected from the group consisting of melt-processible fluoropolymers, partially fluorinated polymers, thermoplastic polymers, thermoplastic fluoroelastomers; aromatic condensation polymers; modified polyethylene; modified polypropylene; polyethylene; thermoplastic elastomers; liquid-crystal polymers; and aromatic polyamides.

7. The unitized membrane electrode assembly of claim 5 wherein the sealing polymer is reinforced with fibers, fabrics, or inorganic fillers.

8. The unitized membrane electrode assembly of claim 1 wherein the insulation layer has a resistivity of greater than 10E4 ohm-cm.

9. The unitized membrane electrode assembly of claim 8 wherein the insulation layer has a resistivity of greater than 10E6 ohm-cm.

10. The unitized membrane electrode assembly of claim 1 wherein the insulation layer is selected from the group consisting of fiber glass cloth, para-aramid fiber based papers, polyimide film, polyamide film, polyester film, modified linear low density polyolefin, and particles or fibers in a resin matrix.

11. The unitized membrane electrode assembly of claim 1 wherein the sealing polymer and the insulation layer are the same polymer.

12. A unitized membrane electrode assembly comprising:
   (a) a first porous gas diffusion-backing layer having sealing edges substantially uniformly impregnated with a fluid impermeable polymer;
   (b) a first electrocatalyst layer present on the inner surface of said first gas diffusion backing layer;
   (c) a polymer electrolyte membrane having outer edges within the outer edges of the first and second gas diffusion backing layers;
   (d) a second porous gas diffusion backing layer having sealing edges substantially uniformly impregnated with a fluid-impermeable polymer; and
   (e) a second electrocatalyst layer present on the inner surface of a second gas diffusion-backing layer;
   (f) at least one frame-shaped insulation layer positioned between said polymer electrolyte membrane and a second electrocatalyst layer, the inner edges of the insulation layer overlapping the outer edges of said polymer electrolyte membrane and the outer edges of said insulation layer being coincident with the edges of the gas diffusion-backing layers;
   (g) a fluid-impermeable polymeric seal that envelops the outer edges of the polymer electrolyte membrane.

13. A process of preparing a unitized membrane electrode assembly using compression molding comprising:
   (a) forming a multilayer sandwich comprising, in order, a first gas diffusion backing layer having sealing edges and first and second surfaces; a first electrocatalyst layer; a polymer electrolyte membrane having outer edges; a second electrocatalyst layer; and a second gas diffusion backing layer having sealing edges and first and second surfaces; and further comprising first and second frame shaped sealing polymer layers having inner and outer edges, wherein the first frame shaped sealing polymer layer may be positioned on either side of the first gas diffusion backing layer, and the second frame shaped sealing polymer layer may be positioned on either side of the second gas diffusion backing layer, and wherein the frame shaped sealing polymer layers overlap the sealing edges of the first and second gas diffusion backing layers; and further comprising a frame shaped insulation layer having inner and outer layer edges, positioned between the first and second gas diffusion backing layers, and wherein the inner edges of the insulating layer and the outer edges of the polymer membrane overlap; and
   (b) compression molding the multilayer sandwich, wherein the sealing polymer is impregnated into the sealing edges of the first and second gas diffusion backing layers, and the sealing polymer envelops the polymer electrolyte membrane to form a polymer, fluid impermeable seal, and the frame shaped insulation layer, prevents contact between the first and second gas diffusion backing layers.

14. The process of claim 13 wherein the compression molding was done at a pressure of 500 to 600 kPa.

15. The process of claim 13 wherein the inner edges of the framed insulation layer overlap the outer edges of the polymer electrolyte membrane by 2 to 4 mm.

16. The process of claim 13 wherein first and second electrocatalyst layers are present on the polymer electrolyte membrane to form a catalyst coated membrane.

17. The process of claim 16 wherein first and second electrocatalyst layers extend to the outer edges of the polymer electrolyte membrane.

18. The process of claim 13 wherein the first and second electrocatalyst layers are present on the first and second gas diffusion backing layers on the sides facing the polymer electrolyte membrane to form gas diffusion electrodes.

19. The process of claim 13 wherein at least one additional framed insulation layer is present between the first and second gas diffusion backing layers.

20. The process of claim 13 further comprising additional framed sealing polymer layers, wherein the additional framed sealing polymer layers are positioned on both sides of the first, second or both gas diffusion backing layers.

21. The process of claim 20 wherein four framed sealing polymer layers are used.

22. The process of claim 13 wherein the sealing polymer is a selected from a thermosetting polymer or a thermoplastic polymer.

23. The process of claim 22 wherein the sealing polymer is selected from the group consisting of melt-processible fluoropolymers, partially fluorinated polymers, thermoplastic polymers, thermoplastic fluoroelastomers aromatic condensation polymers; modified polyethylene; modified polypropylene; polyethylene; thermoplastic elastomers; liquid-crystal polymers; and aromatic polyamides.

24. The process of claim 22 wherein the sealing polymer is reinforced with fibers, fabrics, or inorganic fillers.

25. The process of claim 13 wherein the insulation layer has a resistivity of greater than about 10E4 ohm-cm.

26. The process of claim 25 wherein the insulation layer has a resistivity of greater than about 10E6 ohm-cm.

27. The process of claim 25 wherein the insulation layer is selected from the group consisting of fiber glass cloth, para-aramid fiber based papers, polyimide film, polyamide film, polyester film, modified linear low density polyolefin, and particles or fibers in a resin matrix.

28. The process of claim 13 wherein the electrocatalyst layers composition comprises a catalyst and a binder.

29. The process of claim 28 wherein the catalyst is selected from the group consisting of platinum, ruthenium, rhodium, iridium and electroconductive oxides thereof.

30. The process of claim 28 wherein the binder is a perfluorinated sulfonic acid polymer.

31. The process of claim 13 wherein the polymer electrolyte membrane comprises a perfluorinated sulfonic acid polymer.

32. The process of claim 13 further comprising at least one release layer positioned around the multilayer sandwich.

33. The process of claim 32 wherein two release layers are present.

34. The process of claim 32 wherein at least one shim is present on the release layer on the surface away from the multilayer sandwich.

35. The process of claim 34 wherein the shim has a frame shaped configuration.

36. The process of claim 35 wherein the shim extends inwardly past the inner edge of the sealing polymer layer.

37. The process of claim 33 wherein the release layer functions as a shim.

38. The process of claim 13 wherein after step (b) the compression molded multilayer sandwich is trimmed.

39. The process of claim 35 wherein after step (b) the compression molded multilayer sandwich is trimmed.

40. An electrochemical cell comprising a unitized membrane electrode assembly of claim 1.

* * * * *